United States Patent
Kang et al.

(10) Patent No.: US 9,380,085 B2
(45) Date of Patent: Jun. 28, 2016

(54) SERVER AND METHOD FOR PROVIDING COLLABORATION SERVICE, AND SOCIALITY MANAGEMENT SERVER

(71) Applicant: ELECTRONICS AND TELECOMMUNICATIONS RESEARCH INSTITUTE, Daejeon (KR)

(72) Inventors: Dong-Oh Kang, Daejeon (KR);
Changseok Bae, Daejeon (KR);
Jeun-Woo Lee, Daejeon (KR);
Kyuchang Kang, Daejeon (KR);
Hyungjik Lee, Daejeon (KR);
Joon-Young Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 258 days.

(21) Appl. No.: 13/946,640

(22) Filed: Jul. 19, 2013

(65) Prior Publication Data

US 2014/0067952 A1    Mar. 6, 2014

(30) Foreign Application Priority Data

Aug. 30, 2012   (KR) .......................... 10-2012-0095358

(51) Int. Cl.
*H04L 29/06*       (2006.01)
*H04L 29/08*       (2006.01)

(52) U.S. Cl.
CPC .............. *H04L 65/403* (2013.01); *H04L 67/16* (2013.01)

(58) Field of Classification Search
CPC ............................. H04L 65/403; H04L 67/16
See application file for complete search history.

(56) References Cited

U.S. PATENT DOCUMENTS

| | | | | |
|---|---|---|---|---|
| 7,945,470 | B1 * | 5/2011 | Cohen et al. | 705/7.13 |
| 8,738,681 | B1 * | 5/2014 | Burke et al. | 709/201 |
| 2003/0033389 | A1 * | 2/2003 | Simpson | 709/220 |
| 2005/0021714 | A1 * | 1/2005 | Yook et al. | 709/223 |
| 2010/0131859 | A1 * | 5/2010 | Ferris | G06Q 10/10 715/751 |
| 2010/0146123 | A1 | 6/2010 | Park et al. | |
| 2011/0047558 | A1 * | 2/2011 | Agulnik et al. | 719/318 |
| 2013/0047247 | A1 * | 2/2013 | Matsuda | 726/9 |
| 2014/0006502 | A1 * | 1/2014 | Gandhi | G06F 9/52 709/204 |

FOREIGN PATENT DOCUMENTS

| | | |
|---|---|---|
| KR | 10-2004-0090600 | 10/2004 |
| KR | 10-2009-0044093 | 5/2009 |
| KR | 10-2010-0066346 | 6/2010 |
| KR | 10-0989122 | 10/2010 |
| KR | 10-2010-0129488 | 12/2010 |
| KR | 10-2011-0130903 | 12/2011 |
| KR | 10-2012-0011364 | 2/2012 |

* cited by examiner

*Primary Examiner* — Brian J Gillis
*Assistant Examiner* — Gil H. Lee
(74) *Attorney, Agent, or Firm* — Staas & Halsey LLP

(57) ABSTRACT

Disclosed herein are a server and method for providing collaboration service, and a sociality management server. The server includes a service provision unit and a space construction unit. The service provision unit sets up collaboration service corresponding to the results of combining functions of at least two collaboration terminals based on sociality values corresponding to the at least two collaboration terminals. The space construction unit constructs a service provision device space via which the collaboration service is to be provided. The service provision unit provides the collaboration service to the at least two collaboration terminals via the service provision device space.

6 Claims, 4 Drawing Sheets

SERVER AND METHOD FOR PROVIDING COLLABORATION SERVICE, AND SOCIALITY MANAGEMENT SERVER

CROSS REFERENCE TO RELATED APPLICATION

This application claims the benefit of Korean Patent Application No. 10-2012-0095358, filed on Aug. 30, 2012, which is hereby incorporated by reference in its entirety into this application.

BACKGROUND OF THE INVENTION

1. Technical Field

The present invention relates generally to a server and method for providing collaboration service, and a sociality management server and, more particularly, to a server and method that provide collaboration service to at least two terminals over a network to which zero configuration technology has been applied based on the sociality values of the at least two terminals, and a sociality management server that manages sociality.

2. Description of the Related Art

Conventional functional collaboration between terminals is based on predefined settings between the functions of the terminals, and thus it causes inconvenience to a user in that he or she should personally perform the task of matching the functions of the terminals or the task of performing settings on the terminals.

Korean Patent Application Publication NO. 2011-0130903 discloses technology that enables the efficient provision of service when the services from a plurality of devices are required in order to process a single service.

Furthermore, Korean Patent Application Publication NO. 2009-0044093 discloses technology that stores a connection state between a mobile device and a service device and session information related to the connection in a specific service space, automatically restores a connection between the mobile device and the service device over a local area network based on the connection state and the session information without resetting when the mobile device enters a service area, and then allows the two device to perform close collaboration.

Moreover, Korean Patent Application Publication NO. 2004-0090600 discloses technology that provides a model of service, a device structure and an operation process that provides consistent service to a plurality of controlled devices having the same service.

However, these conventional collaboration service technologies do not take into consideration the sociality of a terminal user, and thus there are only the option of sharing functions between terminals and the option of not sharing functions, so that the conventional technologies are disadvantageous in that various types of collaboration service cannot be provided.

SUMMARY OF THE INVENTION

Accordingly, the present invention has been made keeping in mind the above problems occurring in the prior art, and an object of the present invention is to provide a server and method that provide collaboration service to at least two terminals over a network to which zero configuration technology has been applied based on the sociality values of the at least two terminals. In this case, the sociality value may be a set of multiple values.

In accordance with an aspect of the present invention, there is provided a server for providing collaboration service, including a service provision unit configured to set up collaboration service corresponding to the results of combining functions of at least two collaboration terminals based on sociality values corresponding to the at least two collaboration terminals; and a space construction unit configured to construct a service provision device space (virtual space) via which the collaboration service can be provided; wherein the service provision unit provides the collaboration service to the at least two collaboration terminals via the service provision device space.

Each of the sociality values may include fixed sociality based on fixed information of each of the at least two collaboration terminals and dynamic sociality based on dynamic information of each of the at least two collaboration terminals. The sociality value may be a group of multiple values.

The fixed information may include a fixed function of the corresponding collaboration terminal and user information, while the dynamic information may include the current location of the corresponding collaboration terminal and the service being provided to a user.

The collaboration service provision server may operate in conjunction with a sociality management server that assigns a sociality value corresponding to each of the at least two collaboration terminals.

The sociality management server may include an information management unit configured to manage collaboration terminal information and user information corresponding to the at least two collaboration terminals in the form of a database; a sociality management unit configured to assign and manage sociality values based on the collaboration terminal information; a connection unit configured to maintain connections to the at least two collaboration terminals using a specific protocol; and a request processing unit configured to provide a sociality value corresponding to an external request.

In accordance with another aspect of the present invention, there is provided a method of providing collaboration service, including assigning corresponding sociality values to at least two collaboration terminals based on collaboration terminal information corresponding to the at least two collaboration terminals; setting up collaboration service corresponding to the results of combining functions of the at least two collaboration terminals based on the sociality values; constructing a service provision device space (virtual space) via which the collaboration service can be provided; and providing the collaboration service to the at least two collaboration terminals via the service provision device space.

Providing the collaboration service to the at least two collaboration terminals may include providing the collaboration service to the at least two collaboration terminals over a network to which zero configuration technology has been applied.

Each of the sociality values includes fixed sociality based on fixed information including a fixed function of each of the at least two collaboration terminals and user information, and dynamic sociality based on dynamic information including the current location of each of the at least two collaboration terminals and the service being provided to a user.

In accordance with still another aspect of the present invention, there is provided a sociality management server, including an information management unit configured to manage collaboration terminal information and user information corresponding to at least two collaboration terminals in a database form; a sociality management unit configured to assign and manage sociality values based on the collaboration terminal information; and a request processing unit configured to provide a sociality value corresponding to an external request; wherein the request processing unit provides the sociality value to the service provision server, and provides collaboration service, corresponding to the results of combining functions of the at least two collaboration terminals based on the sociality values, to the at least two collaboration terminals.

Each of the sociality values may include fixed sociality based on fixed information including a fixed function of each of the at least two collaboration terminals and user information, and dynamic sociality based on dynamic information including the current location of each of the at least two collaboration terminals and the service being provided to a user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
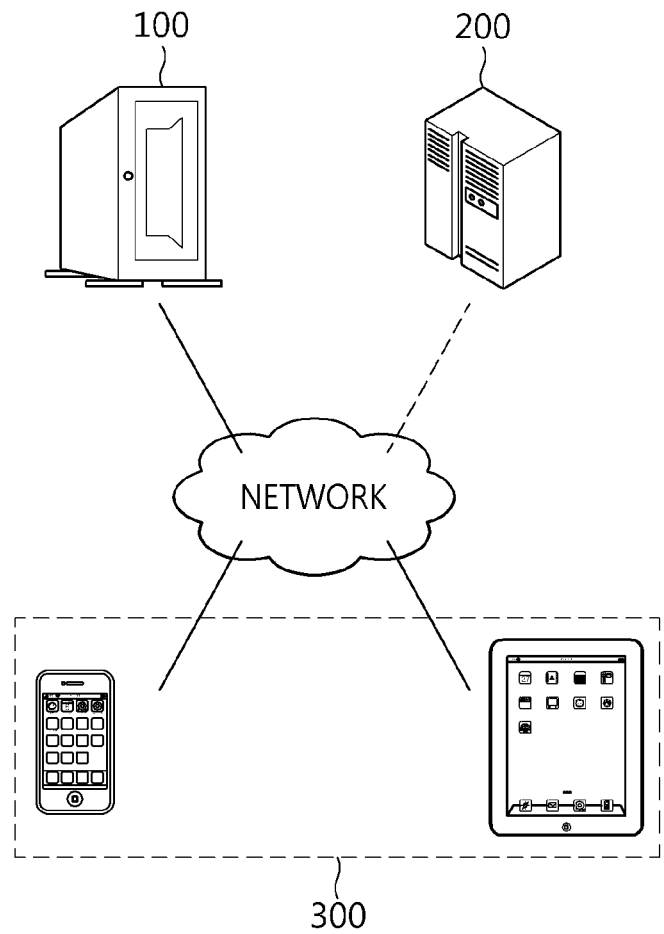
FIG. 1 is a configuration diagram schematically illustrating a collaboration service provision environment according to an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

A server and method that provide collaboration service to at least two terminals over a network to which zero configuration technology has been applied based on the sociality values of the at least two terminals, and a sociality management server in accordance with the present invention preferred embodiment will be described in detail below with reference to the accompanying drawings.

First, a zero configuration technology is used to connect a computer to a network without requiring a user's manual work.

The present invention provides an integrated device function that can be easily used by a user because a user setting procedure is performed via an intuitive and easy zero configuration technology based on the sociality values of devices upon collaboration between at least two terminals or upon the simultaneous use of at least two terminals, thereby enabling the at least two terminal to be easily used like a single terminal, and to operate while sharing data. A user can construct and use an easy and familiar computer environment using a plurality of devices via the present invention.

FIG. 1 is a configuration diagram schematically illustrating a collaboration service provision environment according to an embodiment of the present invention.

Referring to FIG. 1, the collaboration service provision environment includes a sociality management server 100, a service provision server 200, and at least two collaboration terminals 300.

The sociality management server 100 receives respective pieces of collaboration terminal information corresponding to the two collaboration terminals 300 from the two collaboration terminals 300, and assigns corresponding sociality values to the two collaboration terminals 300 based on the collaboration terminal information.

The service provision server 200 receives the sociality values from the sociality management server 100, and combines the functions of the at least two collaboration terminals 300, that is, sets up collaboration service, based on the sociality values. Furthermore, the service provision server 200 constructs a space (virtual space) via which collaboration service can be provided to the at least two collaboration terminals 300, that is, a service provision device space, and provides collaboration service to the at least two collaboration terminals 300 via the service provision device space.

As described above, the service provision server 200 according to an embodiment of the present invention corresponds to a collaboration service provision server that provides collaboration service to the at least two collaboration terminals 300.

The at least two collaboration terminals 300 receive collaboration service via the service provision device space constructed by the service provision server 200, and provides the received collaboration service to the users of the corresponding collaboration terminals.

Next, the sociality management server 100 will be described in detail with reference to FIG. 2.

Figure 2:
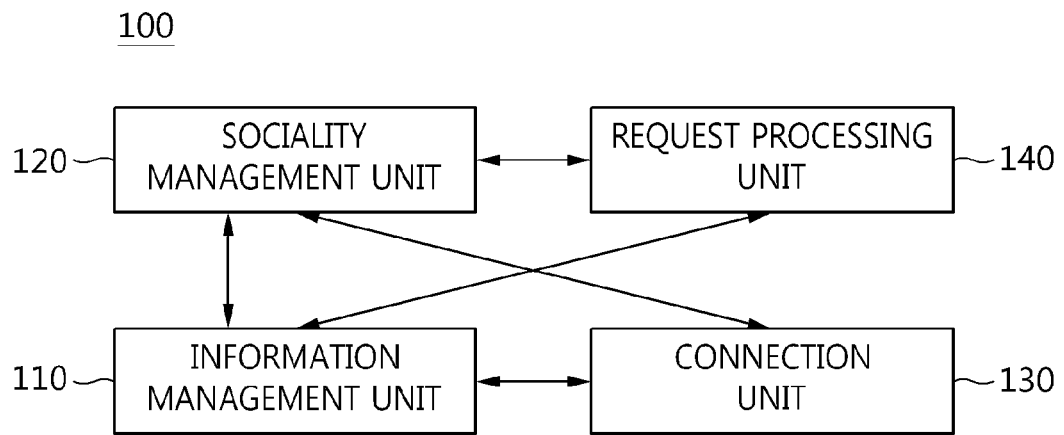
FIG. 2 is a configuration diagram illustrating a sociality management server according to an embodiment of the present invention.

FIG. 2 is a configuration diagram illustrating the sociality management server 100 according to an embodiment of the present invention.

Referring to FIG. 2, the sociality management server 100 includes an information management unit 110, a sociality management unit 120, a connection unit 130, and a request processing unit 140.

The information management unit 110 manages respective pieces of collaboration terminal information corresponding to the at least two collaboration terminals 300 and respective pieces of user information corresponding to the at least two collaboration terminals 300 in the form of a database.

The sociality management unit 120 assigns sociality values based on the collaboration terminal information, and manages them.

The sociality value according to an embodiment of the present invention may be divided into a fixed sociality and a dynamic sociality. The fixed sociality is based on the fixed information of the collaboration terminal 300, and the dynamic sociality is based on the dynamic information of the collaboration terminal 300. Here, the fixed information is the information of the collaboration terminal 300 that does not vary depending on the time and place, such as the fixed function of the collaboration terminal 300 and the user information of the collaboration terminal 300. In contrast, the dynamic information is the information of the collaboration terminal 300 that varies depending on the time and place, such as the current location of the collaboration terminal 300 and the service that is being provided to the user by the collaboration terminal 300.

The connection unit 130 corresponds to a module that maintains a connection to the at least two collaboration terminals 300. The connection unit 130 serves to receive an external request via a specific communication protocol and to transfer a response corresponding to the received request to the outside.

The request processing unit 140 provides a sociality value corresponding to a request, other than the at least two collaboration terminals 300. Chiefly, the request processing unit 140 transfers a sociality value corresponding to a request from the service provision server 200 to the service provision server 200.

Next, the service provision server 200 will be described in detail with reference to FIG. 3.

Figure 3:
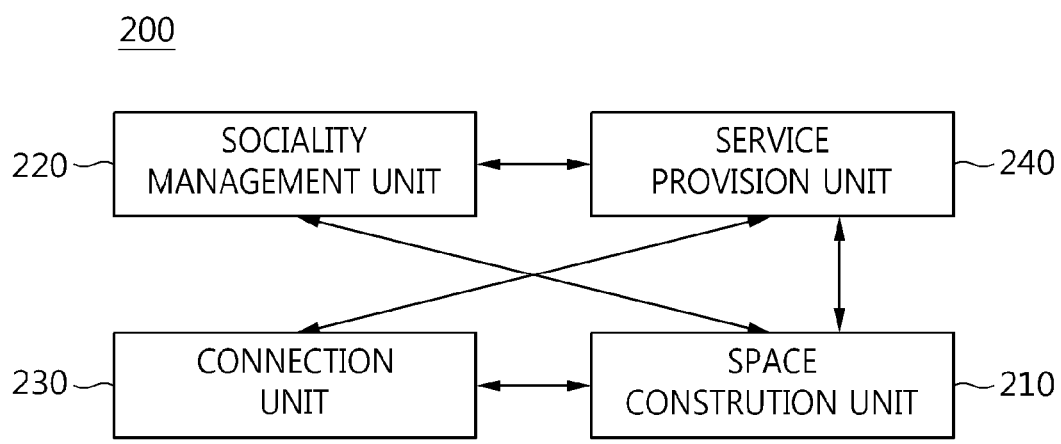
FIG. 3 is a configuration diagram illustrating a server for providing service according to an embodiment of the present invention.

FIG. 3 is a configuration diagram illustrating the service provision server according to an embodiment of the present invention.

Referring to FIG. 3, the service provision server 200 includes a space construction unit 210, a sociality management unit 220, a connection unit 230, and a service provision unit 240.

The space construction unit 210 combines the functions of the at least two collaboration terminals 300 based on the sociality values, and constructs a virtual space via which a service corresponding to the results of the combination can be provided, that is, a service provision device space. In this case, the space construction unit 210 receives the sociality values via the sociality management unit 220, and transfers the service provision device space to the at least two collaboration terminals 300 via the connection unit 230.

The sociality management unit 220 receives the sociality values corresponding to the at least two collaboration terminals 300 from the sociality management server 100, and manages them.

The connection unit 230 serves to maintain connections with the at least two collaboration terminals 300.

The service provision unit 240 provides service to the at least two collaboration terminals 300 via the service provision device space (virtual space) that is constructed by the space construction unit 210.

Although the above-described service provision server 200 according to the embodiment of the present invention has been described as being configured as an independent physical server on a network, it may be configured as software installed inside each of the at least two collaboration terminals 300.

Next, the collaboration terminal 300 will be described in detail with reference to FIG. 4.

Figure 4:
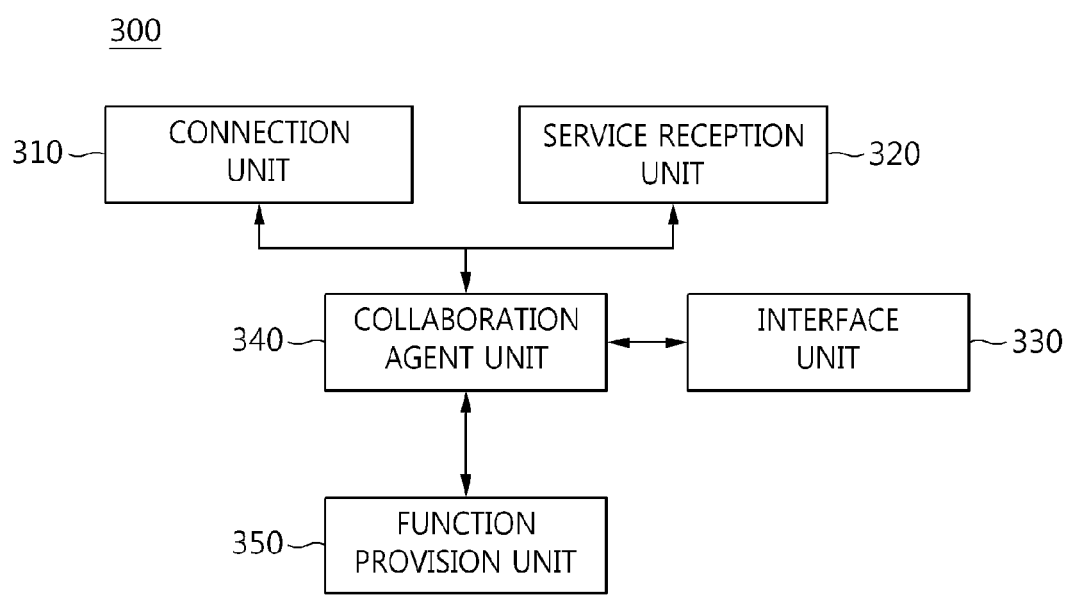
FIG. 4 is a configuration diagram illustrating a collaboration terminal according to an embodiment of the present invention.

FIG. 4 is a configuration diagram illustrating the collaboration terminal 300 according to an embodiment of the present invention.

Referring to FIG. 4, the collaboration terminal 300 includes a connection unit 310, a service reception unit 320, an interface unit 330, a collaboration agent unit 340, and a function provision unit 350.

The connection unit 310 is responsible for communication with the sociality management server 100, transfers its own collaboration terminal information and user information to the sociality management server 100, and receives a corresponding sociality value.

The service reception unit 320 is responsible for a communication with the service provision server 200, and receives service from the service provision server 200.

The interface unit 330 provides an interface function that provides service provided by the service reception unit 320 to a user. Here, the interface unit 330 operates in conjunction with the collaboration agent unit 340.

The collaboration agent unit 340 controls the function of the collaboration terminal 300, and manages the life cycle of the user of the collaboration terminal 300. Furthermore, the collaboration agent unit 340 provides its ID, hardware information, and function information to the outside.

The function provision unit 350 may be configured in the form of a server that provides the function of the collaboration terminal 300, but is not limited thereto.

Next, a method of providing collaboration service will be described in detail with reference to FIG. 5.

Figure 5:
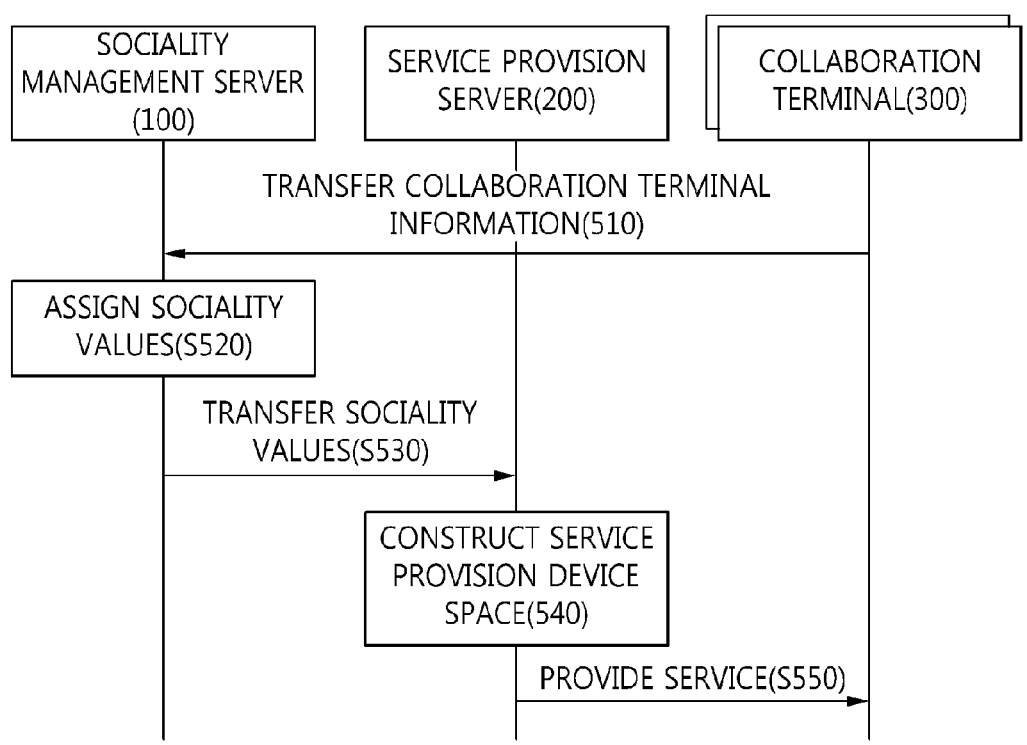
FIG. 5 is a flowchart illustrating a method of providing collaboration service according to an embodiment of the present invention.

FIG. 5 is a flowchart illustrating a method of providing collaboration service according to an embodiment of the present invention.

First, the collaboration service provision system may provide collaboration service to at least two terminals over a network to which zero configuration technology has been applied based on the sociality values of the two terminals. For this purpose, the collaboration service provision system includes a sociality management server 100, a service provision server 200, and at least two collaboration terminals 300.

Referring to FIG. 5, each of the at least two collaboration terminals 300 transfers its own collaboration terminal information to the sociality management server 100 at step S510. Here, the collaboration terminal information includes its ID, hardware information, function information, the life cycle of the user, etc.

At step S520, the sociality management server 100 aligns a sociality value to each of the collaboration terminals 300 based on the collaboration terminal information received at step S510. Here, the sociality value may be divided into a fixed sociality and a dynamic sociality. The fixed sociality is based on the fixed information of the collaboration terminal 300, and the dynamic sociality is based on the dynamic information of the collaboration terminal 300. The fixed information is the information of the collaboration terminal 300 that does not vary depending on the time and place, such as the fixed function of the collaboration terminal 300 and the user information of the collaboration terminal 300. In contrast, the dynamic information is the information of the collaboration terminal 300 that varies depending on the time and place, such as the current location of the collaboration terminal 300 and the service that is being provided to the user by the collaboration terminal 300.

Next, the sociality management server 100 transfers the sociality value assigned to each of the collaboration terminals 300 to the service provision server 200 at step S530.

The service provision server 200 constructs a space (virtual space) via which collaboration service corresponding to the sociality value received from the sociality management server 100 can be provided, that is, a service provision device space at step S540. Before constructing the service provision device space, the service provision server 200 combines the functions of the at least two collaboration terminals 300, that is, sets up collaboration service, based on the sociality values.

At step S550, the service provision server 200 provides collaboration service to the at least two collaboration terminals 300 via the service provision device space constructed at step S540.

In accordance with the present invention, the collaboration service provision system and method provides an integrated device function that can be easily used by a user because a user setting procedure is performed via an intuitive and easy zero configuration technology based on the sociality values of devices upon collaboration between at least two terminals or upon the simultaneous use of at least two terminals, thereby enabling the at least two terminal to be easily used like a single terminal, and to operate while sharing data.

Furthermore, the present invention enables a user to construct and use an easy and familiar computer environment using a plurality of devices, and thus the prevent invention can be utilized for smart working, such as mobile working and home working.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A server for providing collaboration service, comprising:
    a processor coupled to a memory;
    a service provider running on the processor and configured to set up collaboration service corresponding to results of combining functions of at least two collaboration terminals based on sociality values corresponding to the at least two collaboration terminals, the sociality values having a fixed sociality based on fixed information of each of the at least two collaboration terminals, where the fixed information is the information of the at least two collaboration terminals that does not vary depending on time and place, and where the fixed information includes a fixed function of the corresponding collaboration terminal and user information, and a dynamic sociality based on dynamic information of each of the at least two collaboration terminals, where the dynamic information is the information of the at least two collaboration terminals that varies depending on the time and place, and where the dynamic information includes a current location of the corresponding collaboration terminal and a service being provided to a user; and
    a space constructor configured to construct a service provision device space via which the collaboration service is to be provided and transfer the service provision device space to the at least two collaboration terminals;
    wherein the service provider provides the collaboration service to the at least two collaboration terminals via the service provision device space.

2. The server of claim 1, wherein the server operates in conjunction with a sociality management server that assigns a sociality value corresponding to each of the at least two collaboration terminals.

3. The server of claim 2, wherein the sociality management server includes:
    an information manager configured to manage collaboration terminal information and user information corresponding to the at least two collaboration terminals in a database form;
    a sociality manager configured to assign and manage the sociality values based on the collaboration terminal information;
    a connector configured to maintain connections to the at least two collaboration terminals using a specific protocol; and
    a request processor configured to provide a sociality value corresponding to an external request.

4. A method of providing collaboration service, comprising:
    assigning corresponding sociality values to at least two collaboration terminals based on collaboration terminal information corresponding to the at least two collaboration terminals, the sociality values having a fixed sociality based on fixed information of each of the at least two collaboration terminals, where the fixed information is the information of the at least two collaboration terminals that does not vary depending on time and place, and wherein the fixed sociality is further based on fixed information including a fixed function of each of the at least two collaboration terminals and user information, and a dynamic sociality based on dynamic information of each of the at least two collaboration terminals, where the dynamic information is the information of the at least two collaboration terminals that varies depending on the time and place, and wherein the dynamic sociality is further based on dynamic information including a current location of each of the at least two collaboration terminals and a service being provided to a user;
    setting up collaboration service corresponding to results of combining functions of the at least two collaboration terminals based on the sociality values;
    constructing a service provision device space via which the collaboration service is to be provided;
    transferring the service provision device space to the at least two collaboration terminals; and
    providing the collaboration service to the at least two collaboration terminals via the service provision device space.

5. The method of claim 4, wherein providing the collaboration service to the at least two collaboration terminals includes providing the collaboration service to the at least two collaboration terminals over a network to which zero configuration technology has been applied.

6. A sociality management server, comprising:
    a processor coupled to a memory;
    an information manager running on the processor and configured to manage collaboration terminal information and user information corresponding to at least two collaboration terminals in a database form;
    a sociality manager configured to assign and manage sociality values based on the collaboration terminal information, the sociality values having a fixed sociality based on fixed information of each of the at least two collaboration terminals, where the fixed information is the information of the at least two collaboration terminals that does not vary depending on time and place, and wherein the fixed sociality is further based on fixed information including a fixed function of each of the at least two collaboration terminals and user information, and a dynamic sociality based on dynamic information of each of the at least two collaboration terminals, where the dynamic information is the information of the at least two collaboration terminals that varies depending on the time and place, and wherein the dynamic sociality is further based on dynamic information including a current location of each of the at least two collaboration terminals and a service being provided to a user; and
    a request processor configured to provide a sociality value corresponding to an external request;
    wherein the request processor provides the sociality value to a service provision server, and provides collaboration service, corresponding to results of combining functions of the at least two collaboration terminals based on the sociality values, to the at least two collaboration terminals.

* * * * *